United States Patent
Hashimoto et al.

(10) Patent No.: US 9,269,504 B2
(45) Date of Patent: Feb. 23, 2016

(54) ELECTRODE, METHOD FOR PRODUCING ELECTRODE, AND ENERGY DEVICE, ELECTRONIC DEVICE, AND TRANSPORTATION DEVICE INCLUDING ELECTRODE

(75) Inventors: Yasuhiro Hashimoto, Nara (JP); Takuma Asari, Osaka (JP); Shigeo Hayashi, Kyoto (JP); Hironori Kumagai, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 174 days.

(21) Appl. No.: 14/118,154

(22) PCT Filed: May 24, 2012

(86) PCT No.: PCT/JP2012/003391
§ 371 (c)(1),
(2), (4) Date: Nov. 15, 2013

(87) PCT Pub. No.: WO2012/160822
PCT Pub. Date: Nov. 29, 2012

(65) Prior Publication Data
US 2014/0093773 A1  Apr. 3, 2014

(30) Foreign Application Priority Data

May 25, 2011 (JP) .................................. 2011-116629

(51) Int. Cl.
*H01M 4/13* (2010.01)
*H01G 11/36* (2013.01)
(Continued)

(52) U.S. Cl.
CPC ............... *H01G 11/36* (2013.01); *H01G 11/22* (2013.01); *H01G 11/28* (2013.01); *H01G 11/66* (2013.01);
(Continued)

(58) Field of Classification Search
CPC ....... B82Y 30/00; H01G 11/22; H01G 11/28; H01G 11/36; H01G 11/66; H01M 10/0525; H01M 4/625; H01M 4/663; H01M 4/667; Y02E 60/13; Y02T 10/7011; Y02T 10/7022; Y10S 977/746; Y10S 977/948; Y10T 156/10
See application file for complete search history.

(56) References Cited

U.S. PATENT DOCUMENTS 6,280,854 B1 * 8/2001 Tasaka et al. .................. 428/500
2001/0020927 A1 * 9/2001 Ikawa et al. ..................... 345/87
(Continued)

FOREIGN PATENT DOCUMENTS

| JP | 2-847 B2 | 1/1990 |
| JP | 2002-100398 A | 4/2002 |
| JP | 2004-345918 A | 12/2004 |
| JP | 2006-222175 A | 8/2006 |
| JP | 2009-088394 A | 4/2009 |
| JP | 2010-062335 A | 3/2010 |
| WO | 02-095098 A1 | 11/2002 |
| WO | 2006-135439 A2 | 12/2006 |

OTHER PUBLICATIONS

International Search Report issued in PCT/JP2012/003391, dated Aug. 12, 2012.

*Primary Examiner* — Patrick Ryan
*Assistant Examiner* — Ben Lewis
(74) *Attorney, Agent, or Firm* — McDermott Will & Emery LLP (57) ABSTRACT

Disclosed herein is an electrode for energy devices such as electric double layer capacitors, which includes conductive fibers made of carbon, such as carbon nanotubes, as an electrode active material and has a high capacitance. The electrode for energy devices includes a current collector and a plurality of conductive fibers (e.g., carbon nanotubes) provided to stand on a surface of the current collector so that their one ends are electrically connected to the surface of the current collector, wherein the conductive fibers are made of carbon and have carboxyl group-containing functional groups or oxo group-containing functional groups and hydroxyl group-containing functional groups attached thereto. The conductive fibers preferably carry a quinone group-containing compound.

19 Claims, 4 Drawing Sheets

(51) Int. Cl.
*H01G 11/22* (2013.01)
*H01G 11/28* (2013.01)
*H01G 11/66* (2013.01)
*H01M 4/66* (2006.01)
*H01M 4/62* (2006.01)
*H01M 10/0525* (2010.01)
*B82Y 30/00* (2011.01)

(52) U.S. Cl.
CPC .............. *H01M 4/625* (2013.01); *H01M 4/663* (2013.01); *H01M 4/667* (2013.01); *B82Y 30/00* (2013.01); *H01M 10/0525* (2013.01); *Y02E 60/13* (2013.01); *Y02T 10/7011* (2013.01); *Y02T 10/7022* (2013.01); *Y10S 977/746* (2013.01); *Y10S 977/948* (2013.01); *Y10T 156/10* (2015.01)

(56) References Cited

U.S. PATENT DOCUMENTS

| | | | |
|---|---|---|---|
| 2003/0068550 | A1 | 4/2003 | Naoi et al. |
| 2005/0042450 | A1* | 2/2005 | Sano et al. .................... 428/375 |
| 2006/0204853 | A1* | 9/2006 | Chen ......................... 429/231.8 |
| 2007/0202403 | A1* | 8/2007 | Oh et al. ........................ 429/217 |
| 2009/0263642 | A1* | 10/2009 | Handa et al. ................ 428/297.4 |
| 2010/0179054 | A1* | 7/2010 | Swager et al. ................ 502/162 |
| 2013/0113359 | A1* | 5/2013 | Swager et al. ................ 313/232 |

* cited by examiner

ELECTRODE, METHOD FOR PRODUCING ELECTRODE, AND ENERGY DEVICE, ELECTRONIC DEVICE, AND TRANSPORTATION DEVICE INCLUDING ELECTRODE

RELATED APPLICATIONS

This application is the U.S. National Phase under 35 U.S.C. §371 of International Application No. PCT/JP2012/003391, filed on May 24, 2012, which in turn claims the benefit of Japanese Application No. 2011-116629, filed on May 25, 2011, the disclosures of which Applications are incorporated by reference herein.

TECHNICAL FIELD

The present invention relates to an electrode including conductive fibers such as carbon nanotubes, a method for producing the electrode, and an energy device, an electronic device, and a transportation device including the electrode.

BACKGROUND ART

In recent years, researches on fine fibers such as nanowires, nanotubes, and nanohorns have been actively made. As materials constituting nanowires, silver, silicon, gold, copper, zinc oxide, titanium oxide, gallium nitride, etc. have been studied. As nanotubes and nanohorns, for example, carbon nanotubes and carbon nanohorns are known, respectively.

Carbon nanotubes most promising as a conductive material have the structure of a graphite sheet rolled into a cylinder. Further, carbon nanotubes are a material having a hollow structure with a diameter of about 0.7 nm to 100 nm and a length of several micrometers to several millimeters. The electric properties of carbon nanotubes depend on their diameter or chirality, and range from metallic to semiconducting. Further, carbon nanotubes have no dangling bonds and are therefore chemically stable. Further, carbon nanotubes are composed of only carbon atoms, and are therefore attracting attention as an environmentally-friendly material.

Carbon nanotubes have such physical properties as described above, and are therefore expected to be used as an electron emission source for flat panel displays, an electrode material for lithium batteries, or an electrode material for electric double layer capacitors, or are expected to be applied to a probe.

Carbon nanotubes can be synthesized by, for example, arc discharge using carbon electrodes, thermal decomposition of benzene, or laser deposition. However, in these methods, impurities such as graphite or carbon nanoparticles are synthesized together with carbon nanotubes. Therefore, in order to apply the thus synthesized carbon nanotubes to the above-mentioned electron emission source, electrode for batteries, or probe, impurities such as graphite or carbon nanoparticles need to be previously removed. Further, the synthesized carbon nanotubes have various lengths and are oriented in random directions, and therefore their properties as an electron emission source are limited.

In recent years, a method for directly synthesizing oriented carbon nanotubes has been reported. For example, a method has been proposed, in which perpendicularly-oriented single-walled nanotubes are densely obtained on a Si wafer by plasma CVD. According to this method, the amount of impurities such as graphite or carbon nanoparticles is small, and carbon nanotubes whose fibers are oriented in the same direction can be obtained. Therefore, the produced carbon nanotubes can be easily applied to an electron emission source, an electrode for batteries, a probe, etc.

Further, active research and development have been carried out to apply carbon nanotubes to an electrode material (especially, an electrode material for electric double layer capacitors) by taking advantage of their large surface area. Further, there is an example using an electrode obtained by vertically growing carbon nanotubes on the surface of a current collector with the above-described technique.

An electric double layer capacitor is a condenser utilizing an electric double layer formed between an electrode active material and an electrolytic solution, and has been used as a backup power supply. However, such electric double layer capacitors have recently come to be used in electric cars, and are therefore expected to rapidly grow in the future. As a conventional electrode active material for electric double layer capacitors, one using activated carbon is widely known (see, for example, Patent Document 1). However, carbon nanotubes have an outer surface area of 2600 to 3000 m$^2$/g, which is much larger than that of activated carbon, and exhibit very strong mechanical properties and excellent electronic properties. For this reason, electric double layer capacitors using carbon nanotubes as an electrode active material are attracting attention.

Electric charge Q stored in a condenser is generally expressed as Q=CV, where C is the capacitance of the condenser and V is voltage difference. Energy E stored in the condenser is expressed as E=½CV$^2$. Therefore, stored energy per unit volume of active material is proportional to the capacitance of the condenser per unit volume of active material.

The stored energy of an electric double layer capacitor is preferably as large as possible. Therefore, methods have been developed to increase a condenser capacitance by subjecting an electrode active material to some kind of treatment.

Patent Document 2 discloses an electrochemical capacitor in which two or more electrodes composed of an active material powder, a conductive auxiliary agent (carbon powder), and an organic binder are opposed to each other with a separator interposed therebetween, and a space between each of the electrodes and the separator is filled with an aqueous electrolytic solution containing a quinone-based compound dissolved therein.

Patent Document 3 discloses the use of a carbon material/conductive polymer composite material, formed by coating the surface of a carbon material (carbon black or activated carbon) having a high specific surface area with a conductive polymer that causes a specific oxidation-reduction reaction, as an electrode for energy storage elements such as capacitors.

Patent Document 4 does not give a description about an increase in condenser capacitance, but discloses a technique to stabilize the dispersion of a carbon material, such as activated carbon, graphite, or conductive carbon, in a composition for capacitors by adding an organic dye derivative, an anthraquinone derivative, an acridone derivative, or a triazine derivative having a basic functional group or an organic dye derivative or a triazine derivative having an acid functional group to the composition for capacitors.

Patent Document 5 does not give a description about an electrode material, but discloses a method for purifying carbon nanotubes by irradiating the carbon nanotubes with ultraviolet light in an oxygen-containing atmosphere (air or oxygen atmosphere) to decompose and remove impurities.

PRIOR ART DOCUMENTS

Patent Documents

Patent Document 1: JP-B2-2-847
Patent Document 2: JP-A-2002-100398
Patent Document 3: JP-A-2003-109875
Patent Document 4: JP-A-2010-62335
Patent Document 5: JP-A-2004-345918

DISCLOSURE OF THE INVENTION

Problems to be Solved by the Invention

The inventions disclosed in Patent Documents 2 to 4 are intended to improve the condenser properties of a capacitor using a carbon powder or the like as an electrode material by adding various materials, but in Patent Documents 2 to 4, there is no description about the use of conductive fibers made of carbon, such as carbon nanotubes, as an electrode active material.

Further, the invention disclosed in Patent Document 5 is simply intended to purify carbon nanotubes, that is, irradiation of carbon nanotubes with ultraviolet light in a simple oxygen-containing atmosphere is not intended to introduce specific functional groups into the carbon nanotubes.

Under the circumstances, it is an object of the present invention to provide an electrode including, as an electrode active material, conductive fibers made of carbon, such as carbon nanotubes, and having a high capacitance when used in an energy device, a method for producing the electrode, and an energy device, an electronic device, and a transportation device including the electrode.

Means for Solving the Problems

The present invention is directed to an electrode including: a current collector; and a plurality of conductive fibers provided to stand on a surface of the current collector so that their one ends are electrically connected to the surface of the current collector, wherein the conductive fibers are made of carbon and have carboxyl group-containing functional groups attached thereto.

The present invention is also directed to an electrode including: a current collector; and a plurality of conductive fibers provided to stand on a surface of the current collector so that their one ends are electrically connected to the surface of the current collector, wherein the conductive fibers are made of carbon and have oxo group-containing functional groups and hydroxyl group-containing functional groups attached thereto.

In the electrode according to the present invention, the conductive fibers preferably carry a quinone group-containing compound.

The present invention is also directed to a method for producing the electrode, including the step of attaching carboxyl groups to the conductive fibers made of carbon and provided to stand on the surface of the current collector so that their one ends are electrically connected to the surface of the current collector.

The present invention is also directed to a method for producing the electrode, including the step of attaching oxo group-containing functional groups and hydroxyl group-containing functional groups to the conductive fibers made of carbon and provided to stand on the surface of the current collector so that their one ends are electrically connected to the surface of the current collector.

The electrode production method according to the present invention preferably further includes the step of allowing the conductive fibers to carry a quinone group-containing compound.

The present invention is also directed to an energy device including a positive electrode, a separator, and a negative electrode stacked in this order, wherein at least one of the positive electrode and the negative electrode is the electrode described above, and a space between the positive electrode and the negative electrode is filled with an electrolytic solution.

The present invention is also directed to an electronic device including the energy device and an electric circuit, wherein an electric current is supplied from the energy device to the electric circuit, or a transportation device including the energy device and a driving unit, wherein an electric current is supplied from the energy device to the driving unit.

Effects of the Invention

The use of the electrode according to the present invention makes it possible to provide an energy device having a higher capacitance.

PREFERRED MODE FOR CARRYING OUT THE INVENTION

Hereinbelow, embodiments of the present invention will be described in detail.

First Embodiment

In this embodiment, an electrode including conductive fibers having functional groups attached thereto and a method for producing the electrode will be described.

An electrode according to this embodiment includes a current collector and a plurality of conductive fibers provided to stand on a surface of the current collector. One ends of the conductive fibers are electrically connected to the surface of the current collector, but the other ends are not connected to the surface.

The current collector is a plate-shaped member made of a material having conductivity. Examples of the conductive material include, but are not limited to, silicon, stainless steel, iron, aluminum, nickel, titanium, and copper. Among them, aluminum is used as a current collector in electric double layer capacitors using activated carbon as an electrode active material, and can be particularly preferably used also in the present invention. This is because aluminum has a thin passivation film formed on the surface thereof, and is therefore not leached out even when a high voltage is applied thereto.

The conductive fibers used in the present invention are cylindrical hollow members made of carbon. The diameter thereof is preferably 0.1 nm to 100 nm. When having a diameter within the above range, the conductive fibers can be densely provided to stand on the current collector, which makes it possible to form a high-energy density electrode. Examples of the conductive fibers made of carbon include, but are not limited to, carbon nanotubes, carbon nanohorns, and activated carbon fibers. From the viewpoint of ease of oriented synthesis, carbon nanotubes are preferred.

It is to be noted that nanowires made of a metal such as silver, gold, or copper, silicon, zinc oxide, titanium oxide, or gallium nitride are known as conductive fibers made of a material other than carbon, and the same effect as the present invention is considered to be achieved also by attaching carboxyl groups to these nanowires.

A carbon nanotube is a very fine tube-shaped material made of carbon atoms bonded together to form a network and having a hollow cavity with a nanometer-size diameter. Carbon nanotubes used in this embodiment may be single-walled carbon nanotubes or multi-walled carbon nanotubes. A multi-walled carbon nanotube is composed of concentrically-arranged two or more carbon tubes different in diameter. In the present invention, multi-walled carbon nanotubes are preferably used. The use of multi-walled carbon nanotubes as the carbon nanotubes makes it easy for the carbon nanotubes to maintain their shape when functional groups that will be described later are introduced thereinto, and therefore the physical properties of the electrode are less likely to deteriorate. Further, multi-walled carbon nanotubes are excellent in conductivity, and are therefore preferred for electrode applications.

The diameter of the carbon nanotubes is not particularly limited, but, when the carbon nanotubes are used for an electrode for electric double layer capacitors or lithium ion secondary batteries, is preferably in the range of 0.1 nm to 10 nm, more preferably in the range of 0.1 nm to 3 nm, because it is assumed that lithium ions with an ion radius of 0.074 nm or electrolytic ions with an ion radius of about 0.5 nm enter the inside of the carbon nanotubes.

The distance between the carbon nanotubes is preferably short because the density of the carbon nanotubes per unit area can be increased. However, the distance between the carbon nanotubes is preferably enough for electrolytic ions in an electrolytic solution to move.

The carbon nanotubes are preferably provided to stand on the surface of the current collector with catalytic metal particles interposed between the carbon nanotubes and the surface of the current collector. That is, one end of each of the carbon nanotubes is in contact with one of the catalytic metal particles dispersedly provided on the surface of the current collector. When synthesized by a direct synthesis method that will be described later, the carbon nanotubes are provided to stand on the surface of the current collector with catalytic metal particles interposed between the carbon nanotubes and the surface of the current collector.

The conductive fibers used in this embodiment have, as carboxyl group-containing functional groups, carboxyl groups (—COOH) attached to the outer surface thereof. Here, carbon atoms constituting the conductive fibers and carbon atoms in the carboxyl groups are chemically bonded together. By attaching carboxyl groups, it is possible to significantly improve the capacitance of an energy device including the electrode according to this embodiment. It is to be noted that, in this embodiment, not all the carbon nanotubes contained in the electrode need to have carboxyl groups attached thereto. Further, the number of carboxyl groups attached per carbon nanotube may be one or two or more.

The amount of the functional groups contained in the electrode according to this embodiment is not particularly limited and can be appropriately determined depending on a desired electrode capacitance, but, when expressed as a weight ratio to the amount of carbon constituting the conductive fibers (except for the mass of carbon contained in the functional groups) taken as 1, is preferably 0.19 or higher but 0.56 or lower. When the amount of the functional groups contained in the electrode is 0.19 or higher, a sufficient electrode capacitance-increasing effect can be achieved. On the other hand, if the amount of the functional groups contained in the electrode is too large, the electrode capacitance is less likely to be increased in proportion to the amount of the functional groups contained in the electrode or there is a fear that the carbon nanotubes cannot maintain their shape due to the introduction of the functional groups, and therefore the performance of the electrode is degraded. For this reason, the amount of the functional groups contained in the electrode is preferably 0.56 or less. The amount of the functional groups contained in the electrode can be calculated from the intensity ratio between an XPS peak representing carbon constituting the carbon nanotubes and an XPS peak representing carbon constituting a carboxyl group.

Hereinbelow, a method for producing an electrode according to this embodiment will be described.

The production method includes the steps of: preparing a current collector having a plurality of conductive fibers provided to stand on a surface thereof so that their one ends are electrically connected to the surface; and attaching carboxyl groups to the conductive fibers.

First, a method for providing conductive fibers so that they stand on the surface of a current collector will be described. As the conductive fibers, various conductive fibers such as the above-mentioned ones can be used. Here, the method will be described with reference to a case where the conductive fibers are carbon nanotubes, that is, a method for providing a plurality of carbon nanotubes so that they stand on the surface of a current collector will be described.

Carbon nanotubes can be formed by a transfer method. However, from the viewpoint of obtaining highly-oriented carbon nanotubes, a method for growing carbon nanotubes directly on a current collector (direct synthesis method) is preferably used. In this method, synthesis of carbon nanotubes starts from catalytic metal particles attached to the surface of a current collector.

Examples of a material constituting the catalytic metal particles include: metals such as nickel, iron, cobalt, zinc, molybdenum, gold, silver, and copper; alloys containing two or more of these metals; and oxides or carbides of these metals. The material can be appropriately selected depending on a desired diameter of carbon nanotubes to be synthesized and a carbon nanotube synthesis method to be used.

The catalytic metal particles on the surface of a current collector are enlarged by heating during synthesis of carbon nanotubes or by preheating before synthesis of carbon nanotubes. It is believed that there is a correlation between the diameter of the catalytic metal particles at this time and the diameter of carbon nanotubes to be synthesized. Therefore, when a desired diameter of carbon nanotubes is 1 nm to 100 nm, the diameter of the catalytic metal particles is desirably adjusted to 1 nm to 100 nm.

As the method for synthesizing carbon nanotubes directly on a current collector so that they are provided to stand on the current collector, for example, a gas-phase chemical vapor deposition (CVD) method, a laser ablation method, arc discharge, or electrolytic synthesis in solution can be used, but a CVD method is preferably used in this embodiment. The CVD method is mainly classified into two types; a thermal CVD method in which a raw material gas is thermally decomposed and a plasma CVD method in which a raw material gas is decomposed by plasma. Carbon nanotubes can be synthesized by a CVD method at a temperature of 550° C. to 750° C. and a pressure of 200 Pa. More specifically, carbon nanotubes provided to stand on the surface of a current collector are synthesized by introducing, as a carbon source, a hydrocarbon-based gas such as methane, ethylene, or acetylene or an alcohol such as methanol into a chamber and decomposing the carbon source on the current collector on the surface of which catalytic metal particles are provided. Further, a gas such as argon, nitrogen, or hydrogen may be used as a carrier gas for the carbon source. The synthesis time of carbon nanotubes is adjusted depending on a desired length of carbon nanotubes to be synthesized. The synthesis time cannot be generalized because a growth rate varies depending on synthesis temperature, gas pressure, and the kind of carbon source to be used. However, for example, in a case where carbon nanotubes having a length of 100 μm are synthesized under the above-described conditions, the synthesis time can be set to about 10 minutes to 4 hours.

Then, carboxyl group are attached to the conductive fibers provided to stand on the surface of the current collector. The attaching of carboxyl groups to the conductive fibers can be performed by immersing the conductive fibers in nitric acid. However, in the case of such a method, there is a possibility that acid corrodes the current collector or the catalyst, or the conductive fibers are separated from the current collector. Therefore, it is preferred that attaching of carboxyl groups to the conductive fibers is performed by irradiating the conductive fibers with ultraviolet rays in an ozone-containing atmosphere to partially oxide the conductive fibers made of carbon. The irradiation with ultraviolet rays can be performed using, for example, a low-pressure mercury lamp. The irradiation intensity of ultraviolet rays may be, for example, 3 mW/cm$^2$ or more but 20 mW/cm$^2$ or less. When the conductive fibers are irradiated with ultraviolet rays, the current collector is preferably heated. This is because this may promote the reaction of attaching carboxyl groups. It is to be noted that carboxyl groups are not introduced into the conductive fibers even when the conductive fibers are irradiated with ultraviolet rays in an air atmosphere containing no ozone or an oxygen atmosphere.

The electrode thus obtained according to this embodiment may be directly used as an electrode in an energy device, or may be allowed to carry a quinone group-containing compound to obtain an electrode according to a second embodiment.

Second Embodiment

In this embodiment, an electrode including conductive fibers having carboxyl group-containing functional groups attached thereto and carrying a quinone group-containing compound and a method for producing the electrode will be described. The electrode according to this embodiment is the same as that according to the first embodiment except that the conductive fibers carry a quinone group-containing compound. The description of the same will not be repeated.

In this embodiment, the conductive fibers are allowed to carry a quinone group-containing compound, and therefore the quinone group-containing compound and the attached carboxyl groups can synergistically increase the capacitance of an energy device. Here, the term "carry" means that the quinone group-containing compound is physically or chemically bonded or adsorbed to the conductive fibers. The quinone group-containing compound interacts with an electrolyte component having a cation. As a result, the electrode carrying the quinone group-containing compound attracts more cations, and therefore the capacitance of a negative electrode is particularly increased.

In the electrode according to this embodiment, the quinone group-containing compound shall be present on the surface of the current collector, on which the conductive fibers having the carboxyl group-containing functional groups attached thereto are provided to stand. However, microscopically, in addition to the carbon nanotubes having the carboxyl group-containing functional groups attached thereto and carrying the quinone group-containing compound, carbon nanotubes having the carboxyl group-containing functional groups attached thereto but carrying no quinone group-containing compound, carbon nanotubes carrying the quinone group-containing compound but having no carboxyl group-containing functional groups attached thereto, and carbon nanotubes having neither carboxyl group-containing functional groups nor quinone group-containing compound may all be present.

Examples of the quinone group-containing compound include, but are not limited to, naphthoquinone, anthraquinone, 1,4-diaminoanthraquinone, 1,5-diaminoanthraquinone, 2,6-diaminoanthraquinone, o-benzoquinone, p-benzoquinone, 1,4-naphthoquinone, 2-methylanthraquinone, acenaphthenequinone, phenanthraquinone, alpha-hydroxyanthraquinone, quinizarin, chrysazin, 1,2-dihydroxyanthraquinone, 2,3,5,6-tetrachloro-p-benzoquinone, and 2,3-dichloro-5,6-dicyano-p-banzoquinone. They may be used singly or in combination of two or more of them. The quinone group-containing compound has a great effect on improving the capacitance of an energy device, and is therefore preferably a compound having no amino group. Further, the quinone group-containing compound is preferably not a polymer but a monomer. This is because if the quinone group-containing compound is a polymer, it is difficult to perform compression of the conductive fibers, which will be described later, after the conductive fibers are allowed to carry the quinone group-containing compound, if necessary. Here, the monomer refers to a low-molecular-weight compound not including such a repeated structure as included in a polymer.

The amount of the quinone group-containing compound carried by the conductive fibers is not particularly limited. However, in this embodiment, the conductive fibers have carboxyl groups, and therefore can carry a larger amount of the quinone group-containing compound. This is because the carboxyl groups interact with the quinone group-containing compound, and therefore the conductive fibers can carry a larger amount of the quinone group-containing compound as compared to a case where the conductive fibers have no carboxyl groups. As a result, the capacitance can be significantly improved by the synergistic effect of the carboxyl groups and the quinone group-containing compound.

Hereinbelow, a method for producing an electrode according to this embodiment will be described.

The production method includes the steps of: preparing a current collector having a plurality of conductive fibers provided to stand on a surface thereof so that their one ends are electrically connected to the surface; attaching carboxyl group-containing functional groups to the conductive fibers; and allowing the conductive fibers having the carboxyl group-containing functional groups attached thereto to carry a quinone group-containing compound. The description of the steps that have already been described with reference to the first embodiment will not be repeated.

The step of allowing the conductive fibers to carry a quinone group-containing compound is performed by bringing the conductive fibers, which are provided to stand on the surface of the current collector and have the carboxyl group-containing functional groups attached thereto, into contact with a liquid containing the quinone group-containing compound. More specifically, the step can be performed by first dissolving or dispersing a quinone group-containing compound in a solvent or a dispersion medium to obtain a solution or dispersion liquid of the quinone group-containing compound and then bringing the conductive fibers into contact with the solution or the dispersion liquid. The contact can be achieved by immersing the current collector in the solution or the dispersion liquid or by applying or spraying the solution or the dispersion liquid onto the surface of the current collector. After the contact, the solvent or the dispersion medium is preferably removed by drying.

The solvent for dissolving or dispersing a quinone group-containing compound is not particularly limited, and one suitable for dissolving or dispersing a compound to be used shall be appropriately selected. Examples of the solvent include water and organic solvents such as ethanol, acetone, chloroform, propylene carbonate, and tetrahydrofuran.

In the production of the electrode according to this embodiment, attaching of carboxyl group-containing functional groups to the conductive fibers on the surface of the current collector may be performed after allowing the conductive fibers to carry a quinone group-containing compound. However, in this case, there is a fear that a desired effect cannot be obtained because the quinone group-containing compound carried by the conductive fibers is oxidized and further decomposed during attaching of carboxyl groups. For this reason, allowing the conductive fibers to carry a quinone group-containing compound is preferably performed after attaching of carboxyl groups.

Third Embodiment

A wound-type energy device according to this embodiment will be described, which includes at least a pair of wound electrode bodies including the electrode according to the first or second embodiment. Here, the energy device will be described with reference to an electric double layer capacitor, but the present invention is not limited thereto.

Figure 1:
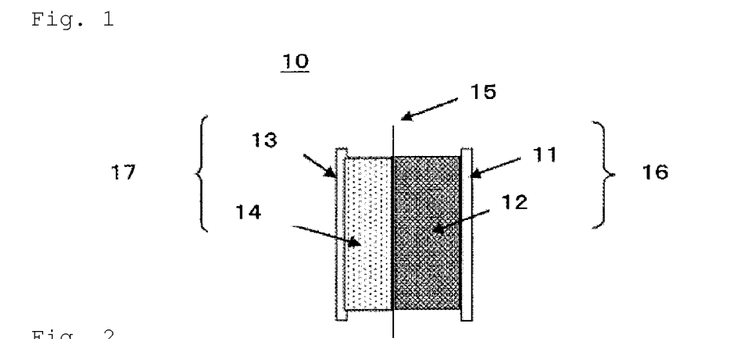
FIG. 1 is a conceptual diagram of an electric double layer capacitor according to a third embodiment of the present invention.

FIG. 1(a) is a conceptual diagram of an electric double layer capacitor according to this embodiment. As shown in FIG. 1, an electric double layer capacitor 10 includes a separator 15 and a positive electrode 16 and a negative electrode 17 that are opposed to each other with the separator 15 interposed therebetween. The positive electrode 16 includes a current collector 11 and a plurality of conductive fibers 12 provided to stand on the current collector 11. The negative electrode 17 includes a current collector 13 and a plurality of conductive fibers 14 provided to stand on the current collector 13. One of the surfaces of the separator 15 is in contact with the conductive fibers 12 and the other surface is in contact with the conductive fibers 14. The electrode according to the first or second embodiment can be used as one or both of the positive electrode 16 and the negative electrode 17. Particularly, the electrode according to the present invention can attract cations, and is therefore preferably used as the negative electrode 17.

The separator 15 is a material that is provided between the positive electrode and the negative electrode to separate them from each other and that holds an electrolytic solution to ensure ion conductivity between the positive electrode and the negative electrode. Examples of a material constituting the separator include, but are not limited to, cellulose, polypropylene, and polytetrafluoroethylene.

In the electric double layer capacitor, a space between the positive electrode and the negative electrode is filled with an electrolytic solution, and the electrolytic solution is held by the separator. As the electrolytic solution, one composed of a solvent and an electrolyte can be used. The solvent for the electrolytic solution is not particularly limited, but may be, for example, one or a combination of two or more selected from propylene carbonate, ethylene carbonate, butyl carbonate, γ-butyrolactone, γ-valerolactone, N-methyl-2-pyrrolidone, N,N-dimethylformamide, 1,3-dimethyl-2-imidazolidinone, N,N-dimethylacetamide, acetonitrile, propionitrile, tetrahydrofuran, dimethyl carbonate, diethyl carbonate, ethylmethyl carbonate, sulfolane, and dimethylsulfoxide.

The electrolyte for the electrolytic solution is not particularly limited, but may be, for example, one or a combination of two or more selected from tetraethylammonium tetrafluoroborate, triethylmethylammonium tetrafluoroborate, triethylmethylammonium bis, tetraethylammonium hexafluorophosphate, and tetraethylammonium bis.

Further, as the electrolytic solution, one or a combination of two or more ionic liquids selected from imidazolium-, pyridinium-, aliphatic-, pyrrolidinium-, ammonium-, phosphonium-, and sulfonium-based compounds.

Electric charge Q stored in a condenser in the electric double layer capacitor is generally expressed as $Q=CV$, where C is the capacitance of the condenser and V is voltage difference. Further, energy E stored in the condenser is expressed as $E=\frac{1}{2}CV^2$. The capacitance per unit volume ($F/cm^3$) is proportional to the density of an active material. Therefore, it is considered that in the case of an electrode using conductive fibers as an active material, its capacitance is proportional to the density of the active material as long as the surface area of the active material is not changed. Therefore, it is considered that the energy per unit volume (energy density) is increased by increasing the density of the active material.

In a case where the conductive fibers are provided to stand on the current collector, the maximum density of a conductive fiber layer achieved by synthesis is not always an ideal maximum density (density at which the surface area per unit volume for adsorption and desorption of ions is maximized) for an active material layer. In order to bring the density of the conductive fiber layer close to an ideal maximum density, in the present invention, the electrode and the separator may be compressed in a state where the separator is stacked on the conductive fiber layer to increase the density of the conductive fiber layer and to pressure-bond the electrode and the separator together into one unit. This makes it possible to increase the density of the conductive fiber layer and therefore to increase the energy density of the electric double layer capacitor without causing a problem such as delamination of the conductive fiber layer. Further, the electrode and the separator are integrated into one unit, and are therefore easy to handle when housed in a container.

Hereinbelow, a method for producing an electric double layer capacitor according to this embodiment will be described.

In the production method according to the present invention, two polar plates (positive electrode and negative electrode) and a separator are first prepared. One of the two polar plates shall be the electrode according to the present invention, and the other polar plate may be another conventionally-known electrode.

Then, a covering process is performed. In the covering process, a laminated body composed of the polar plates and the separator is formed by covering the surface (surface on the side where an electrode active material is present) of each of the polar plates with the separator.

The laminated body thus obtained is impregnated with an electrolytic solution and is finally housed in a container to produce an energy storage device. It is to be noted that the covering process may be performed after the separator or the polar plates are impregnated with an electrolytic solution.

This embodiment has been described with reference to a wound-type energy device, but is not limited thereto. The energy device according to this embodiment of the present invention may be a laminate-type energy device whose electrode bodies are not wound but laminated together.

The electrode according to the present invention can be used as an electrode not only in such electric double layer capacitors as described above but also in general energy storage devices such as electrochemical capacitors, lithium ion capacitors, lithium ion secondary batteries, organic batteries, pseudocapacitance capacitors using metal oxides or conductive polymers. Here, at least one electrode contained in such an energy storage device shall be the electrode according to the present invention.

In the case of electric double layer capacitors or electrochemical capacitors, the electrode according to the present invention can be used as both positive and negative electrodes.

In the case of lithium ion secondary batteries, a lithium metal oxide such as lithium cobalt oxide, a silicon compound, or lithium metal is usually used as a positive-electrode active material and graphite or the like is usually used as a negative-electrode active material. As a negative electrode, the electrode according to the present invention can be used instead of an electrode containing graphite. Further, conductive fibers can be used as a carrier material for an active material in a positive electrode. That is, the electrode according to the present invention carrying the above-described positive-electrode active material can be used as a positive electrode.

In the case of lithium ion capacitors, activated carbon and graphite are proposed as a positive-electrode active material and a negative-electrode active material, respectively, and therefore the electrode according to the present invention can be used as one or both of positive and negative electrodes.

In the case of organic batteries, the use of an organic material as at least one of positive- and negative-electrode active materials has been proposed, and therefore conductive fibers can be used as a carrier material for the organic material. That is, the electrode according to the present invention carrying the active material can be used as at least one of positive and negative electrodes.

As has been described above, in this embodiment according to the present invention, the conductive fibers contained in the electrode according to the present invention may function as an electrode active material or as a carrier material for another electrode active material.

The energy device according to this embodiment can be installed in a mobile device having wireless communication functions typified by a mobile phone, an electronic device, such as an information processing terminal, typified by a laptop computer, or a transportation device typified by a hybrid car.

Figure 7:
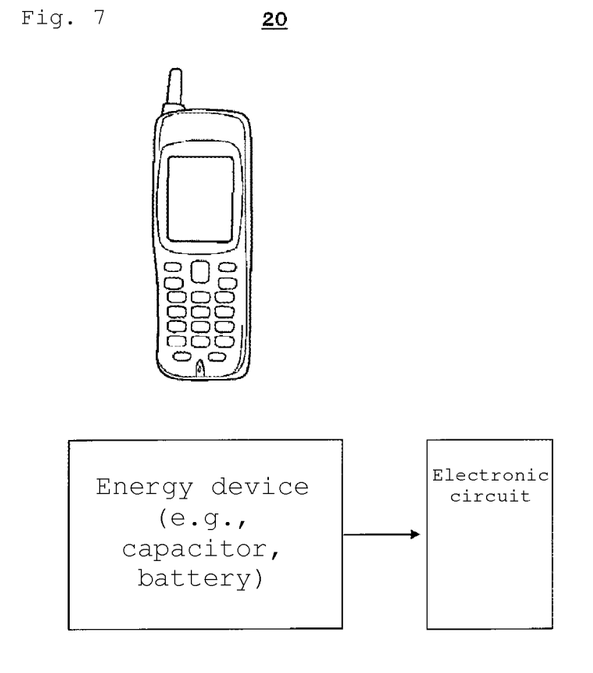
FIG. 7 is a conceptual diagram of a mobile phone equipped with an energy device according to the present invention.

FIG. 7 is a conceptual diagram of one example of an electronic device equipped with the energy device according to this embodiment. An electronic device 20 includes an energy device and an electric circuit, and an electric current is supplied from the energy device to the electric circuit. The electronic device 20 is, for example, a mobile phone. The electric circuit is, for example, an LED flash.

Figure 8:
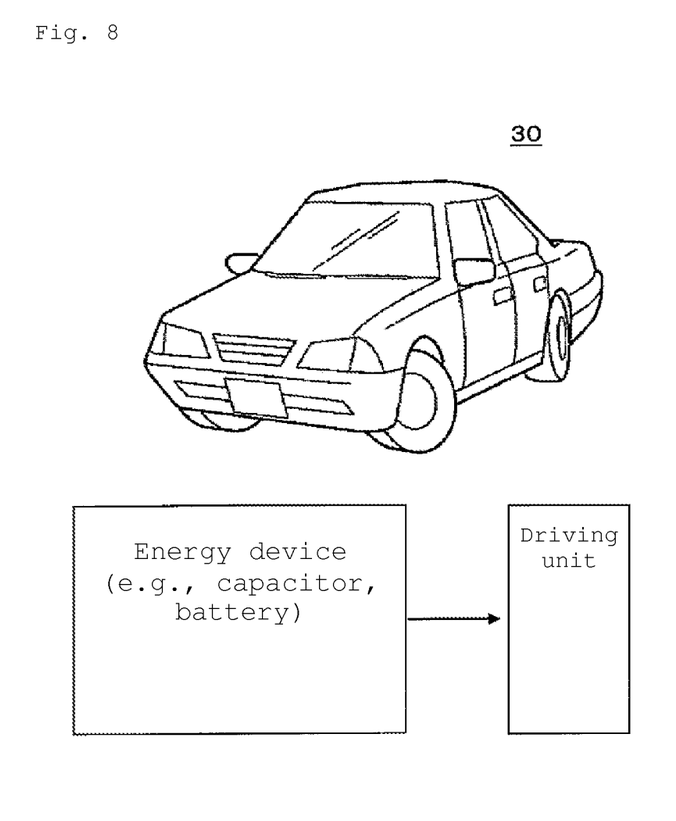
FIG. 8 is a conceptual diagram of a car equipped with an energy device according to the present invention.

FIG. 8 is a conceptual diagram of one example of a transportation device equipped with the energy device according to this embodiment. A transportation device 30 includes an energy device and a driving unit, and an electric current is supplied from the energy device to the driving unit. The transportation device 30 is, for example, an electric car. The driving unit is, for example, an electric motor.

EXAMPLES

Hereinbelow, the present invention will be described in more detail with reference to examples and a comparative example, but is not limited to the following examples.

Example 1

In this example, an electrode was produced, in which conductive fibers having carboxyl groups attached thereto were provided to stand on the surface of a current collector. As the conductive fibers, carbon nanotubes were used.

A current collector was set in an EB evaporator to form a catalytic metal layer thereon, and a layer of Al as a catalyst material was evaporated onto the current collector to a thickness of 0.5 nm, and a layer of Fe as a catalyst material was evaporated onto the Al layer to a thickness of 1 nm. The degree of vacuum before evaporation was set to $1.2E^{-5}$ Pa. The evaporation rate of Al and Fe was set to 1 nm/s. After the evaporation of Fe, the current collector was heated in a vacuum at 300° C. for 30 minutes to form catalytic metal particles on the surface of the current collector.

Then, carbon nanotubes were synthesized. The synthesis of carbon nanotubes was performed by a plasma CVD method. As a reaction gas and a carrier gas, $CH_4$ and hydrogen were used, respectively. The current collector having the catalytic metal particles on the surface thereof was set in a chamber, and the chamber was evacuated using a rotary pump and a turbomolecular pump. The chamber reached a degree of vacuum of $5E^{-4}$ Pa. Then, $CH_4$ and hydrogen were flowed into the chamber. The flow rates thereof were set to 25 sccm and 40 sccm, respectively. The output power of microwaves was set to 80 W. The synthesis was performed at a reaction temperature of 645° C. for 70 minutes. In this way, carbon nanotubes were synthesized, which were provided to stand on the surface of the current collector and had an average length of 150 μm. After the completion of the synthesis, the surface of the current collector was observed with a transmission electron microscope (TEM), and it was confirmed that double-walled carbon nanotubes having a diameter of 5 nm were synthesized.

Then, after the completion of synthesis of carbon nanotubes, the surface of the current collector was irradiated with ultraviolet rays in an ozone atmosphere to attach carboxyl groups to the carbon nanotubes. The irradiation with ultraviolet rays was performed using a low-pressure mercury lamp. Ozone was produced in the chamber by flowing oxygen into the chamber with a volume of 1250 $cm^3$ at a flow rate of 100 mL/min. By setting the flow rate of oxygen to 120 mL/min or less, it is possible to limit influence on the carbon nanotubes. Further, by setting the flow rate of oxygen to 80 L/min or more, it is possible to sufficiently promote the reaction of attaching carboxyl groups. At this time, the current collector was heated to 110° C. The ultraviolet irradiation time was changed within the range of 5 minutes to 60 minutes.

Figure 2:
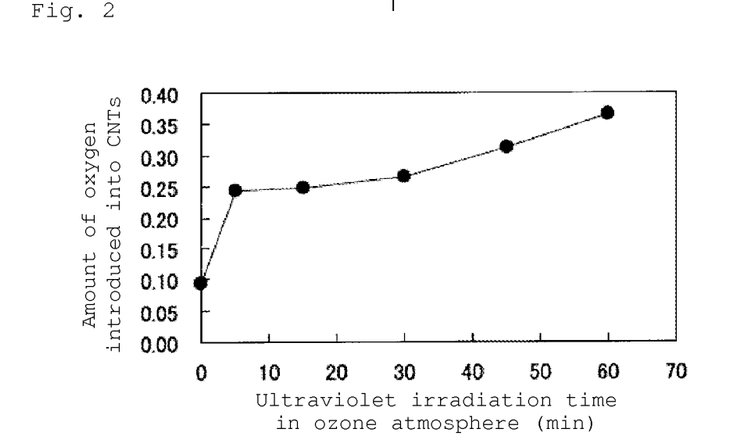
FIG. 2 is a graph showing the measurement results of the amount of oxygen introduced versus ultraviolet treatment time in an ozone atmosphere in Example 1.

After the irradiation with ultraviolet rays, the carbon nanotubes were analyzed by X-ray photoelectron spectroscopy (XPS) to calculate the intensity ratio of O1s/C1s. FIG. 2 shows the measurement results of the amount of oxygen introduced into the carbon nanotubes (intensity ratio of O1s/C1s) versus the ultraviolet irradiation time in an ozone atmosphere. It can be seen that the amount of oxygen introduced increases as the UV irradiation time increases.

Figure 3:
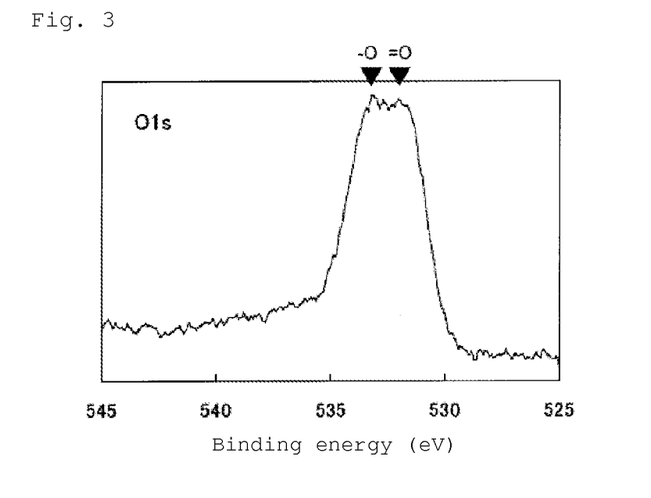
FIG. 3 is a spectrum showing the XPS measurement results of carbon nanotubes after ultraviolet treatment in Example 1.

Further, the spectrum of XPS was closely examined in a range where the binding energy of O1s was 530 eV to 535 eV, and as a result, two peaks having substantially the same height were observed, one of which was at a position corresponding to the single bond of oxygen and the other of which was at a position corresponding to the double bond of oxygen (FIG. 3). The presence of these two peaks indicates that the carbon nanotubes after irradiation with ultraviolet rays contain carboxyl groups.

From the above, it is considered that the amount of carboxyl groups introduced into the carbon nanotubes increases as the ultraviolet irradiation time increases. This also indicates that the amount of carboxyl groups to be introduced can be adjusted by changing the ultraviolet irradiation time.

It is to be noted that this embodiment has been described with reference to a case where functional groups to be attached to conductive fibers such as carbon nanotubes are carboxyl groups, but the present invention is not limited thereto. As shown in the spectrum of FIG. 3, both the peak representing a double bond between a carbon atom and an oxygen atom and the peak representing a single bond between a carbon atom and an oxygen atom are detected, from which it is considered that the functional groups to be attached to conductive fibers used in the present invention have both an oxo group (=O)-containing functional group and a hydroxyl group (—OH)-containing functional group. Further, it is considered that the relationship between the amount of functional groups and the capacitance of conductive fibers having both oxo group-containing functional groups and hydroxyl group-containing functional groups attached thereto is the same as that of the conductive fibers having carboxyl group-containing functional groups. Further, the conductive fibers having both oxo group-containing functional groups and hydroxyl group-containing functional groups attached thereto can be produced in the same manner as the conductive fibers having carboxyl group-containing functional groups attached thereto.

Comparative Example 1

In this comparative example, an electrode was produced by allowing conductive fibers provided to stand on the surface of a current collector to carry a quinone group-containing compound to measure electric double layer capacitor properties. As the conductive fibers, carbon nanotubes were used. As the quinone group-containing compound, naphthoquinone was used.

The carbon nanotubes provided to stand on the surface of a current collector were produced in the same manner as in Example 1.

Then, the carbon nanotubes were allowed to carry naphthoquinone.

First, naphthoquinone was dissolved in acetone until a saturated solution was obtained. The carbon nanotubes provided to stand on the surface of a current collector were immersed in the solution for 6 hours. After the carbon nanotubes were pulled out of the solution, the surface of the current collector was washed with acetone. In this way, the carbon nanotubes were allowed to carry naphthoquinone.

Then, the capacitance of the electrode as an electric double layer capacitor was measured. The measurement was performed by a three-electrode system using an Ag/Ag+ reference electrode. As an electrolytic solution, one obtained by dissolving tetraethylammonium tetrafluoroborate in propylene carbonate was used. The concentration of the tetraethylammonium tetrafluoroborate was set to 0.7 mol/L. After washed with acetone, the electrode as a current collector was immersed in the electrolytic solution, and then the electrolytic solution was allowed to penetrate into every part of the electrode active material by reducing the pressure to the extent that the electrolytic solution did not come to boil.

The cyclic voltammogram of the electrode, which had been impregnated with the electrolytic solution in such a manner as described above, was measured at a voltage sweep rate of 40 mV/sec in a voltage range of −1.5 V to +1.0 V. As a result, the electrode exhibited excellent capacitor properties.

Further, the charge-discharge properties of the electrode were measured. The electrode was charged to −1.5 V at a constant current of 0.2 A/g, and was then discharged at a constant current of 0.2 A/g. The condenser capacitance of the electrode was calculated from the slope of a straight line obtained by plotting voltage against time during discharge. The condenser capacitance C can be determined by $C = I \times \Delta t / \Delta V$, where I is discharge current and $\Delta V$ is voltage change during time change $\Delta t$. As a result, the condenser capacitance was 42 F/g.

Further, the condenser capacitance of the electrode before allowing the conductive fibers to carry naphthoquinone was measured and found to be 36 F/g. From this, it is found that the capacitance was slightly increased (about 1.17 times) by allowing the conductive fibers to carry naphthoquinone.

Example 2

In this example, an electrode was produced by attaching carboxyl groups to conductive fibers provided to stand on the surface of a current collector and further allowing the conductive fibers to carry a quinone group-containing compound to measure electric double layer capacitor properties. As the conductive fibers, carbon nanotubes were used. As the quinone group-containing compound, naphthoquinone was used.

The carbon nanotubes provided to stand on the surface of a current collector were produced in the same manner as in Example 1, and attaching of carboxyl groups was also performed in the same manner as in Example 1. In this example, the number of carboxyl groups attached per six-membered carbon ring constituting the carbon nanotubes was changed from 0 to 0.675 by changing the ultraviolet irradiation time.

The carbon nanotubes were allowed to carry a quinone group-containing compound in the same manner as in Comparative Example 1.

Figure 4:
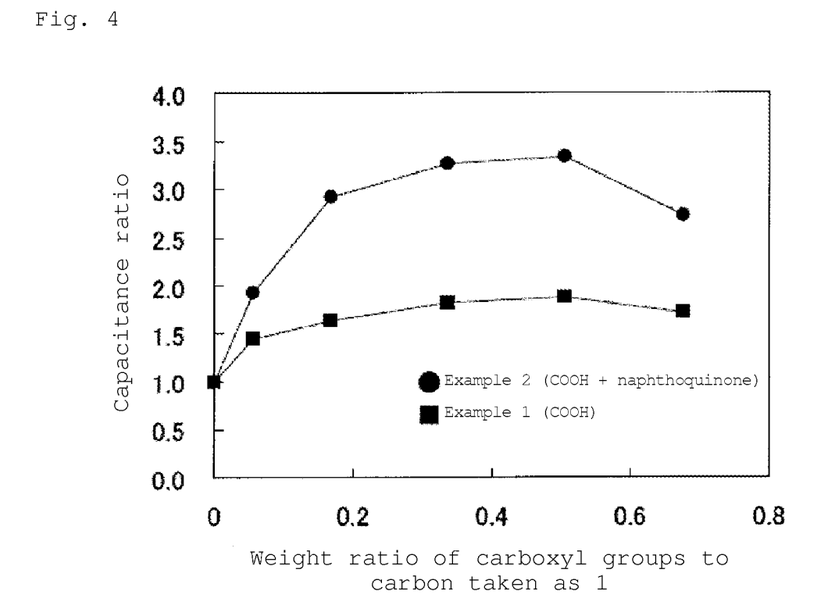
FIG. 4 is a graph showing the results of determining the relationship between the amount of carboxyl groups and capacitance in Example 1 (carboxyl groups) and Example 2 (carboxyl groups+naphthoquinone).

A condenser capacitance was measured using the electrode of this example by the method described with reference to Comparative Example 1, and the results are shown in FIG. 4. FIG. 4 also shows the results of measuring a condenser capacitance using the electrode of Example 1 (which has carboxyl groups attached thereto but carries no quinone group-containing compound). In FIG. 4, the condenser capacitance is represented on the ordinate as a relative ratio to a condenser capacitance measured using an electrode having no carboxyl groups attached thereto.

As can be seen in FIG. 4, in both cases of Examples 1 and 2, the condenser capacitance is significantly increased by introducing carboxyl groups as compared to when carboxyl groups are not introduced (when the amount of carboxyl groups is 0). Further, it can be seen that the condenser capacitance tends to increase as the amount of carboxyl groups attached increases.

In Example 1 in which the conductive fibers did not carry naphthoquinone, the capacitance was increased up to 1.9 times, whereas in Example 2 in which the conductive fibers carried naphthoquinone, the capacitance was increased up to 3.3 times. It can be seen from the result that the condenser capacitance is significantly increased by further allowing the conductive fibers to carry naphthoquinone when carboxyl groups are present on the conductive fibers.

Example 3

This example was the same as Example 2 except that 1,4-diaminoanthraquinone was used as the quinone group-containing compound.

Figure 5:
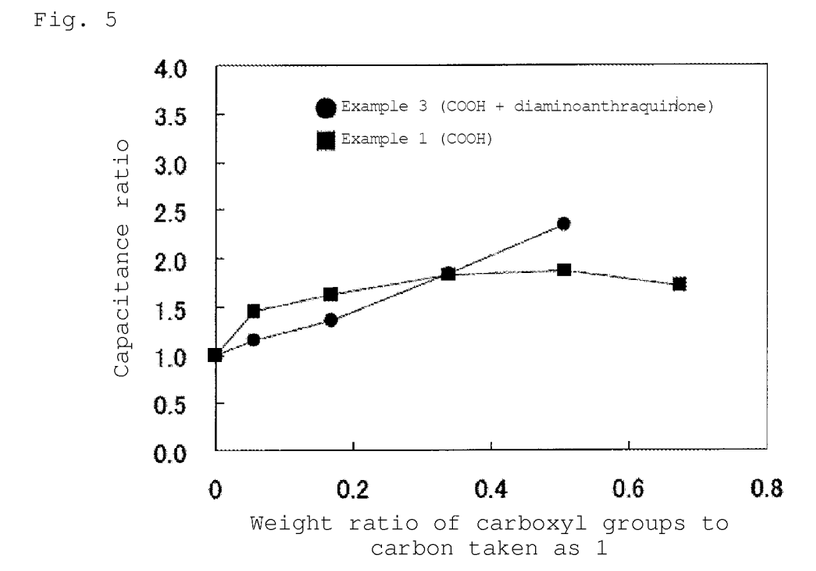
FIG. 5 is a graph showing the results of determining the relationship between the amount of carboxyl groups and capacitance in Example 1 (carboxyl groups) and Example 3 (carboxyl groups+1,4-diaminoanthraquinone).

The results of measuring a condenser capacitance using an electrode of Example 3 are shown in FIG. 5. Also in FIG. 5, the measurement results of Example 1 are shown together. In this example, a capacitance-increasing effect obtained by allowing the conductive fibers to carry 1,4-diaminoanthraquinone was seen in a region where the amount of carboxyl groups attached was large.

Example 4

In this example, benzanthrone (which is a compound having only one double bond of oxygen in a benzene ring) was used, instead of the quinone group-containing compound, as a material having one double bond of oxygen in a benzene ring. This example was the same as Example 2 except for the above.

Figure 6:
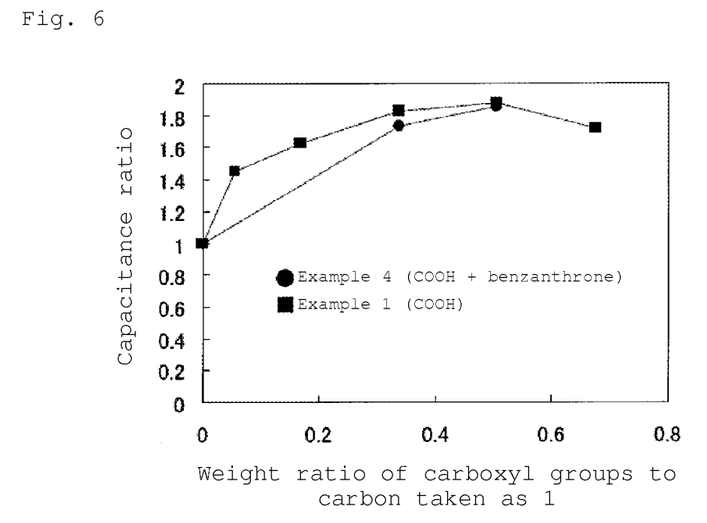
FIG. 6 is a graph showing the results of determining the relationship between the amount of carboxyl groups and capacitance in Example 1 (carboxyl groups) and Example 4 (carboxyl groups+benzanthrone).

The results of measuring a condenser capacitance using an electrode of Example 4 are shown in FIG. 6. Also in FIG. 6, the measurement results of Example 1 are shown together. In this example, an increasing trend in capacitance is reduced as compared to Example 1. This result revealed that a capacitance-increasing effect obtained by attaching carboxyl groups is inhibited by allowing the conductive fibers to carry a compound having only one double bond of oxygen in a benzene ring instead of a quinone group-containing compound.

INDUSTRIAL APPLICABILITY

An energy device using the electrode according to the present invention has a high capacitance and an increased energy density, and is therefore useful as an energy source for mobile terminal devices such as mobile phones and mobile computers and transportation devices such as cars, bicycles, and trains.

REFERENCE SIGNS LIST 10 energy device
11, 13 current collector
12, 14 conductive fibers
15 separator
16 positive electrode
17 negative electrode
20 electronic device
30 electric car

The invention claimed is:

1. An electrode comprising: a current collector; and a plurality of conductive fibers provided to stand on a surface of the current collector so that their one ends are electrically connected to the surface of the current collector,
   wherein the conductive fibers are made of carbon and have carboxyl group-containing functional groups attached thereto, and
   wherein, when expressed as a weight ratio to an amount of carbon constituting the conductive fibers (except for an amount of carbon contained in the functional groups) taken as 1, an amount of the functional groups contained in the electrode is 0.19 or higher but 0.56 or less.

2. The electrode according to claim 1, wherein the conductive fibers have a diameter of 0.1 nm to 100 nm.

3. The electrode according to claim 1, wherein the conductive fibers are carbon nanotubes.

4. The electrode according to claim 3, wherein the carbon nanotubes are provided to stand on the surface of the current collector with catalytic metal particles interposed between the carbon nanotubes and the surface of the current collector.

5. The electrode according to claim 3, wherein the carbon nanotubes are multi-walled carbon nanotubes.

6. The electrode according to claim 1, wherein the conductive fibers further carry a quinone group-containing compound.

7. The electrode according to claim 6, wherein the quinone group-containing compound is a monomer.

8. The electrode according to claim 6, wherein the quinone group-containing compound is naphthoquinone or diaminoanthraquinone.

9. The electrode according to claim 6, wherein the quinone group-containing compound is a compound having no amino group.

10. A method for producing the electrode according to claim 1, the method comprising the step of attaching carboxyl group-containing functional groups to the conductive fibers made of carbon and provided to stand on the surface of the current collector so that their one ends are electrically connected to the surface of the current collector.

11. An energy device comprising a positive electrode, a separator, and a negative electrode stacked in this order,
   wherein at least one of the positive electrode and the negative electrode is the electrode according to claim 1, and a space between the positive electrode and the negative electrode is filled with an electrolytic solution.

12. The energy device according to claim 11, which is a capacitor or a battery.

13. An electronic device comprising the energy device according to claim 11 and an electric circuit, wherein an electric current is supplied from the energy device to the electric circuit.

14. A transportation device comprising the energy device according to claim 11 and a driving unit, wherein an electric current is supplied from the energy device to the driving unit.

15. An electrode comprising: a current collector; and a plurality of conductive fibers provided to stand on a surface of the current collector so that their one ends are electrically connected to the surface of the current collector,
   wherein the conductive fibers are made of carbon and have oxo group-containing functional groups and hydroxyl group-containing functional groups attached thereto, and wherein, when expressed as a weight ratio to an amount of carbon constituting the conductive fibers (except for an amount of carbon contained in the functional groups) taken as 1, an amount of the functional groups contained in the electrode is 0.19 or higher but 0.56 or less.

16. A method for producing the electrode according to claim 15, the method comprising the step of attaching oxo group-containing functional groups and hydroxyl group-containing functional groups to the conductive fibers made of carbon and provided to stand on the surface of the current collector so that their one ends are electrically connected to the surface of the current collector.

17. The method according to claim 10, further comprising the step of allowing the conductive fibers to carry a quinone group-containing compound.

18. The method according to claim 17, wherein the step of allowing the conductive fibers to carry a quinone group-containing compound is performed by bringing the conductive fibers into contact with a liquid containing the quinone group-containing compound.

19. The method according to claim 10, wherein the step of attaching functional groups is performed by irradiating the conductive fibers with ultraviolet rays in an ozone-containing atmosphere.

* * * * *